United States Patent
Su et al.

(10) Patent No.: US 10,333,605 B2
(45) Date of Patent: Jun. 25, 2019

(54) METHOD, SYSTEM AND DEVICE FOR MEASURING CHANNEL STATE INFORMATION

(71) Applicant: CHINA ACADEMY OF TELECOMMUNICATIONS TECHNOLOGY, Beijing (CN)

(72) Inventors: Xin Su, Beijing (CN); Chuanjun Li, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 225 days.

(21) Appl. No.: 15/303,657

(22) PCT Filed: Apr. 22, 2015

(86) PCT No.: PCT/CN2015/077170
§ 371 (c)(1),
(2) Date: Oct. 12, 2016

(87) PCT Pub. No.: WO2015/161795
PCT Pub. Date: Oct. 29, 2015

(65) Prior Publication Data
US 2017/0033856 A1 Feb. 2, 2017

(30) Foreign Application Priority Data
Apr. 23, 2014 (CN) .......................... 2014 1 0166094

(51) Int. Cl.
*H04B 7/0413* (2017.01)
*H04W 24/08* (2009.01)
(Continued)

(52) U.S. Cl.
CPC ............. *H04B 7/0626* (2013.01); *H04B 7/04* (2013.01); *H04B 7/0413* (2013.01);
(Continued)

(58) Field of Classification Search
CPC .......... H04B 7/04; H04B 7/12; H04B 7/0617; H04B 7/0626; H04B 7/0413; H04W 16/28
See application file for complete search history.

(56) References Cited

U.S. PATENT DOCUMENTS

| 8,379,745 B1* | 2/2013 | Nabar | H04B 7/0617 375/267 |
| 2003/0131041 A1* | 7/2003 | Dinker | G06F 9/52 718/104 |

(Continued)

FOREIGN PATENT DOCUMENTS

| CN | 1700801 A | 11/2005 |
| CN | 101877608 A | 11/2010 |

(Continued)

OTHER PUBLICATIONS

Office Action for Taiwanese Patent application No. 104112988 dated Apr. 4, 2016 with English translation provided by foreign associate.

(Continued)

*Primary Examiner* — Omer S Mian
(74) *Attorney, Agent, or Firm* — Ladas & Parry, LLP

(57) ABSTRACT

The present disclosure relates to the field of wireless communication technology, in particular to a method, system and device for measuring CSI, so as to solve the problem in the related art where, on the premise that a Massive MIMO technology plays to its strengths, a CSI measurement and feedback mechanism on the basis of a downlink reference signal may lead to obvious time-frequency resource overhead. The method includes steps of: transmitting, by a network side device, a group of reference signals which have been beamformed to a User Equipment (UE), so as to enable the UE to measure the reference signals, each reference signal in the group of reference signals corresponding to a (Continued)

space in a sector; and determining, by the network side device, whether or not a beamforming mode for each reference signal is to be adjusted in accordance with feedback information from the UE. According to the present disclosure, it is able to, on the premise that the Massive MIMO technology plays to its strengths, reduce the time-frequency resource overhead caused by the measurement and feedback of the downlink reference signals.

10 Claims, 3 Drawing Sheets

(51) Int. Cl.
H04W 16/28 (2009.01)
H04L 5/00 (2006.01)
H04B 7/12 (2006.01)
H04B 7/06 (2006.01)
H04B 7/04 (2017.01)
H04W 88/02 (2009.01)
H04B 7/0452 (2017.01)

(52) U.S. Cl.
CPC .............. *H04B 7/0617* (2013.01); *H04B 7/12* (2013.01); *H04L 5/0048* (2013.01); *H04W 16/28* (2013.01); *H04W 24/08* (2013.01); *H04B 7/0452* (2013.01); *H04W 88/02* (2013.01)

(56) References Cited

U.S. PATENT DOCUMENTS

| | | | |
|---|---|---|---|
| 2011/0002373 A1 | 1/2011 | Jeon | |
| 2011/0020521 A1 | 1/2011 | Park et al. | |
| 2012/0076243 A1 | 3/2012 | Gresset et al. | |
| 2013/0042039 A1* | 2/2013 | Hameed ................ | G06F 9/524 710/200 |
| 2013/0059619 A1 | 3/2013 | Kim et al. | |
| 2013/0083774 A1 | 4/2013 | Son et al. | |
| 2013/0094349 A1 | 4/2013 | Hoshino et al. | |
| 2013/0235807 A1 | 9/2013 | Lee et al. | |
| 2013/0328722 A1 | 12/2013 | Wernersson et al. | |
| 2015/0049824 A1 | 2/2015 | Kim et al. | |
| 2015/0189527 A1 | 7/2015 | Wang et al. | |
| 2015/0222340 A1 | 8/2015 | Nagata et al. | |
| 2015/0230102 A1 | 8/2015 | Kang et al. | |

FOREIGN PATENT DOCUMENTS

| | | |
|---|---|---|
| CN | 101971659 A | 2/2011 |
| CN | 102546113 A | 7/2012 |
| JP | 2012/085282 A | 4/2012 |
| JP | 2014/053811 A | 3/2014 |
| KR | 20110008704 A | 1/2011 |
| WO | 2011/161946 A1 | 12/2011 |
| WO | 2013/024942 A1 | 2/2013 |
| WO | 2013133645 A1 | 9/2013 |
| WO | 2013133743 A1 | 9/2013 |
| WO | 2013134128 A1 | 9/2013 |
| WO | 2014019187 A1 | 2/2014 |
| WO | 2014/035216 A1 | 3/2014 |

OTHER PUBLICATIONS

Office Action for Taiwanese Patent application No. 104112988 dated Sep. 12, 2016 with English translation provided by foreign associate.
First Office Action for Japanese application No. 2016/563984 dated Nov. 7, 2017 with machine English translation from Global Dossier.
First Office Action for Chinese application No. 201410166094.X dated Dec. 15, 2016 and search report, with machine English translation from Global Dossier.
Supplementary European Search Report and Opinion for European Patent application No. EP 15782453.3 dated Apr. 24, 2017.
Office Action for Korean Patent application No. 10-2016-7029644 dated Jun. 12, 2017 with English translation provided by foreign associate.
Office Action for Korean Patent application No. 10-2016-7029644 dated Sep. 6, 2017 with English translation provided by foreign associate.
Office Action for Taiwanese Patent application No. 104112988 dated Apr. 4, 2017 with English translation provided by foreign associate.
Office Action for Taiwanese Patent application No. 104112988 dated Sep. 12, 2017 with English translation provided by foreign associate.
Written Opinion of the International Search Authority for PCT/CN2015/077170 dated Jul. 20, 2015, and its English translation provided by WIPO.
International Preliminary Report on Patentability for PCT/CN2015/077170 dated Nov. 29, 2016, and its English translation provided by WIPO.
International Search Report for PCT/CN2015/077170 dated Jul. 20, 2015 and its English translation provided by WIPO.
Written Opinion of the International Search Authority for PCT/CN2015/077170 dated Jul. 20, 2015 and machine English translation from Bing.com translator.
Second Office Action for Japanese application No. 2016/563984 dated Jul. 31, 2018 with machine English translation from Global Dossier.

* cited by examiner

METHOD, SYSTEM AND DEVICE FOR MEASURING CHANNEL STATE INFORMATION

CROSS-REFERENCE TO RELATED APPLICATIONS

The present application is the U.S. national phase of PCT Application PCT/CN2015/077170 filed on Apr. 22, 2015, which claims the priority of the Chinese patent application No. 201410166094.X filed on Apr. 23, 2014 and entitled "method, system and device for measuring channel state information", which are incorporated herein by reference in their entireties.

TECHNICAL FIELD

The present application relates to the field of wireless communication technology, in particular to a method, a system and a device for measuring channel state information.

BACKGROUND

Because a Multiple Input Multiple Output (MIMO) technology plays an important role in a peak rate and a system spectrum utilization rate, such wireless access standards as Long Term Evolution (LTE) and LTE-Advanced (LTE-A) are constructed on the basis of a MIMO+Orthogonal Frequency Division Multiplexing (OFDM) technology. A performance gain of the MIMO technology is derived from a spatial freedom degree capable of being achieved by a multi-antenna system, so during the standardization of the MIMO technology, the most important evolution direction lies in the extension of dimensions. In LTE Release 8, at most four MIMO transmission layers may be supported. In LTE Release 9, a Multiple-User (MU)-MIMO technology has been enhanced, and at most four downlink data layers may be supported by the MU-MIMO with a Transmission Mode (TM)-8. In LTE Release 10, a spatial resolution of Channel State Information (CSI) has been further improved by introducing an 8-port CSI Reference Signal (CSI-RS), and Demodulation Reference Symbol (DMRS) and a multi-granularity codebook, and the transmission capability of Single-User MIMO (SU-MIMO) has been extended to at most eight data layers.

In addition, along with the maturity of an Active Antenna System (AAS) technology and the application of an AAS array in a two-dimensional (2D) plane, the MIMO technology is moving in a three-dimensional (3D) and massive direction. Currently, the $3^{rd}$ Generation Partnership Project (3GPP) is studying 3D channel modeling, and in future, it is expected to study and standardize an Elevation Beamforming (EBF) technology using 8 or fewer ports, and a Full Dimension MIMO (FD-MIMO) technology using more than 8 ports (e.g., 16, 32 or 64 ports). In academia, the MIMO technology on the basis of a massive antenna array (including a hundred of, or hundreds of, or more antenna elements) is now being studied and tested proactively. The research and the preliminary channel test result show that, a massive MIMO technology can improve the system spectrum efficiency remarkably and support more users to access. Hence, the massive MIMO technology has been considered by various research organizations as one of the most potential physical layer technologies for a next-generation mobile communication system.

For the MIMO technology, particularly the MU-MIMO technology, the precision of the CSI capable of being acquired at a network side directly determines the precision of precoding/beamforming and the computational efficiency of a scheduling algorithm, and thereby affecting the performance of an entire system. Hence, the acquisition of the CSI is always one of the core issues in the standardization of the MIMO technology. For a Frequency Division Duplex (FDD) system, there is a relatively large frequency interval between an uplink and a downlink, and usually it is very difficult to directly acquire downlink CSI by measuring an uplink channel. Hence, a CSI measurement and feedback mechanism on the basis of a downlink reference signal is usually adopted by the conventional FDD system. In this case, the spatial resolution of the CSI directly depends on the number of ports for the reference signals. In the case of a very large antenna array, new ports for the reference signals may be introduced so as to ensure the downlink transmission, but this will lead to obvious time-frequency resource overhead. However, in the case that the number of the ports for the reference signals is limited, it is impossible to ensure the spatial resolution for the measurement of the downlink CSI, and as a result, it is impossible for the Massive MIMO technology to play to its strengths.

In a word, on the premise that the Massive MIMO technology plays to its strengths, the CSI measurement and feedback mechanism on the basis of the downlink reference signal may lead to the obvious time-frequency resource overhead.

SUMMARY

An object of the present disclosure is to provide a method, a system and a device for measuring CSI, so as to solve the problem in the related art where, on the premise that the Massive MIMO technology plays to its strengths, the CSI measurement and feedback mechanism on the basis of the downlink reference signal may lead to the obvious time-frequency resource overhead.

In one aspect, the present disclosure provides in some embodiments a method for measuring CSI, including steps of: transmitting, by a network side device, a group of reference signals which have been beamformed to a User Equipment (UE), so as to enable the UE to measure the reference signals, each reference signal in the group of reference signals corresponding to a space in a sector; and determining, by the network side device, whether or not a beamforming mode for each reference signal is to be adjusted in accordance with feedback information from the UE.

In one possible embodiment, the reference signals in the sector correspond to different identifiers.

In one possible embodiment, the step of determining, by the network side device, whether or not the beamforming mode for each reference signal is to be adjusted in accordance with the feedback information from the UE includes: determining, by the network side device, quality information corresponding to each reference signal in accordance with the identifier and quality information from the UE; and determining, by the network side device, whether or not the beamforming mode for each reference signal is to be adjusted in accordance with the quality information corresponding to each reference signal.

In one possible embodiment, subsequent to the step of determining, by the network side device, whether or not the beamforming mode for each reference signal is to be adjusted in accordance with the feedback information from the UE, the method further includes: in the case that the beamforming mode for each reference signal needs to be adjusted, determining, by the network side device, each space in the spaces corresponding to the reference signals with the best quality information; and adjusting, by the network side device, the beamforming mode for the reference signal corresponding to each space, taking the reference signals with the best quality information as a group of reference signals, and transmitting the group of reference signals which have been beamformed to the UE.

In one possible embodiment, each reference signal is a CSI-RS.

In one possible embodiment, the reference signals in the sector correspond to different CSI-RS configurations and/or different CSI-RS ports.

In one possible embodiment, the group of CSI-RSs includes parts of the CSI-RSs broadcast by the network side device, and the CSI-RSs transmitted to different UEs are partially or completely identical.

In one possible embodiment, prior to the step of transmitting, by the network side device, the group of reference signals which have been beamformed to the UE, the method further includes determining, by the network side device, different reference signals in accordance with one or more of time domain, frequency domain and code domain.

In one possible embodiment, the different reference signals are orthogonal to each other.

In another aspect, the present disclosure provides in some embodiments a method for measuring CSI, including steps of: measuring, by a UE, a group of reference signals which have been beamformed and received from a network side device, each reference signal in the group of reference signals corresponding to a space in a sector; and transmitting, by the UE, feedback information to the network side device in accordance with a measurement result, so as to enable the network side device to determine whether or not a beamforming mode for each reference signal is to be adjusted in accordance with the feedback information.

In one possible embodiment, the step of transmitting, by the UE, the feedback information to the network side device in accordance with the measurement result includes transmitting, by the UE, an identifier of the measured reference signal and quality information corresponding to the measured reference signal to the network side device.

In one possible embodiment, the step of transmitting, by the UE, the feedback information to the network side device in accordance with the measurement result includes ranking the identifiers of the reference signals and the quality information corresponding to the reference signals in accordance with channel quality corresponding to the reference signals, and transmitting the ranked identifiers and quality information to the network side device.

In yet another aspect, the present disclosure provides in some embodiments a network side device for measuring CSI, including: a transmission module configured to transmit a group of reference signals which have been beamformed to a UE, so as to enable the UE to measure the reference signals, each reference signal in the group of reference signals corresponding to a space in a sector; and a processing module configured to determine whether or not a beamforming mode for each reference signal is to be adjusted in accordance with feedback information from the UE.

In one possible embodiment, the reference signals in the sector correspond to different identifiers.

In one possible embodiment, the processing module is further configured to: determine quality information corresponding to each reference signal in accordance with the identifier and quality information from the UE; and determine whether or not the beamforming mode for each reference signal is to be adjusted in accordance with the quality information corresponding to each reference signal.

In one possible embodiment, the processing module is further configured to: in the case that the beamforming mode for each reference signal needs to be adjusted, determine each space in the spaces corresponding to the reference signals with the best quality information; and adjust the beamforming mode for the reference signal corresponding to each space, take the reference signals with the best quality information as a group of reference signals, and transmit the group of reference signals which have been beamformed to the UE.

In one possible embodiment, each reference signal is a CSI-RS.

In one possible embodiment, the reference signals in the sector correspond to different CSI-RS configurations and/or different CSI-RS ports.

In one possible embodiment, the group of CSI-RSs includes parts of the CSI-RSs broadcast by the network side device, and the CSI-RSs transmitted to different UEs are partially or completely identical.

In one possible embodiment, the transmission module is further configured to determine different reference signals in accordance with one or more of time domain, frequency domain and code domain.

In one possible embodiment, the different reference signals are orthogonal to each other.

In still yet another aspect, the present disclosure provides in some embodiments a UE for measuring CSI, including: a measurement module configured to measure a group of reference signals which have been beamformed and received from a network side device, each reference signal in the group of reference signals corresponding to a space in a sector; and a feedback module configured to transmit feedback information to the network side device in accordance with a measurement result, so as to enable the network side device to determine whether or not a beamforming mode for each reference signal is to be adjusted in accordance with the feedback information.

In one possible embodiment, the feedback module is further configured to transmit an identifier of the measured reference signal and quality information corresponding to the measured reference signal to the network side device.

In one possible embodiment, the feedback module is further configured to rank the identifiers of the reference signals and the quality information corresponding to the reference signals in accordance with channel quality corresponding to the reference signals, and transmit the ranked identifiers and quality information to the network side device.

In still yet another aspect, the present disclosure provides in some embodiments a system for measuring CSI, including a network side device and a UE. The network side device is configured to transmit a group of reference signals which have been beamformed to the UE, so as to enable the UE to measure the reference signals, and determine whether or not a beamforming mode for each reference signal is to be adjusted in accordance with feedback information from the UE. The UE is configured to measure a group of reference signals which have been beamformed and received from the network side device, and transmit feedback information to the network side device in accordance with a measurement result, so as to enable the network side device to determine whether or not a beamforming mode for each reference signal is to be adjusted in accordance with the feedback information. Each reference signal in the group of reference signals corresponds to a space in a sector.

According to the embodiments of the present disclosure, the network side device transmits a group of reference signals which have been beamformed to the UE, and determines whether or not the beamforming mode for each reference signal is to be adjusted in accordance with the feedback information from the UE, so as to measure the CSI. In addition, due to the use of the reference signals which have been beamformed, the number of the desired reference signals corresponds to the number of beams, rather than the number of antennae, so feedback overhead may not increase without any limitation along with an increase in the number of the antennae. As a result, it is able to, on the premise that the Massive MIMO technology plays to its strengths, reduce the time-frequency resource overhead caused by the measurement and feedback of the downlink reference signals, thereby to improve the resource utilization rate and the system performance.

DETAILED DESCRIPTION OF THE EMBODIMENTS

According to the embodiments of the present disclosure, a network side device transmits a group of reference signals which have been beamformed to a UE, and determines whether or not a beamforming mode for each reference signal is to be adjusted in accordance with feedback information from the UE. In this way, it is able for the network side device to roughly determine a change situation of a channel. In the case that the channel changes slowly, a base station may indicate the UE to measure and return information in a finer manner. As a result, it is able to, on the premise that the Massive MIMO technology plays to its strengths, reduce time-frequency resource overhead caused by the measurement and feedback of downlink reference signals, thereby to improve the resource utilization rate and the system performance.

The present disclosure will be described hereinafter in conjunction with the drawings and embodiments.

Figure 1:
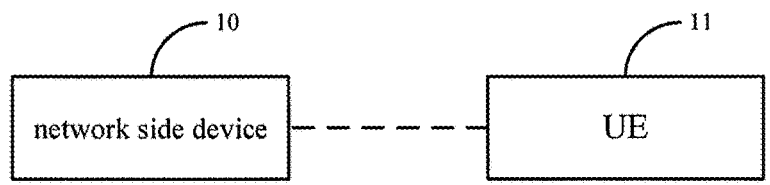
FIG. 1 is a schematic view showing a system for measuring CSI according to the first embodiment of the present disclosure.

As shown in FIG. 1, the present disclosure provides in the first embodiment a system for measuring CSI, which includes a network side device 10 and a UE 11. The network side device 10 is configured to transmit a group of reference signals which have been beamformed to the UE 11, so as to enable the UE 11 to measure the reference signals, and determine whether or not a beamforming mode for each reference signal is to be adjusted in accordance with feedback information from the UE 11. The UE 11 is configured to measure a group of reference signals which have been beamformed and received from the network side device 10, and transmit feedback information to the network side device 10 in accordance with a measurement result, so as to enable the network side device 10 to determine whether or not a beamforming mode for each reference signal is to be adjusted in accordance with the feedback information. Each reference signal in the group of reference signals corresponds to a space in a sector.

In this embodiment, one sector may be segmented into a plurality of spaces. According to the practical need, each space may be further segmented into a plurality of sub-spaces, each sub-space may also be further segmented into a plurality of micro spaces, and so on, so as to provide different spatial resolutions. For example, a sector with a center angle of 120° may be segmented into four spaces, each with a center angle of 30°. Then, each space may be segmented into three sub-spaces, each with a center angle of 10°. Of course, each sub-space may be further segmented into a number of micro spaces.

In this embodiment, the sector may be segmented through a plurality of beams.

During the implementation, the network side device may determine different reference signals in accordance with one or more of time domain, frequency domain and code domain.

In one possible embodiment, the different reference signals are orthogonal to each other.

During the segmentation, a multi-antenna system may generate a specific beam by adding a beamforming weight value, i.e., the beamforming weight value determines an orientation and a shape of the beam.

The beamforming weight value may be determined as follows.

For example, H and V beams may be provided in a horizontal dimension and a vertical dimension respectively, and for a 2D array including $N_H$ horizontal ports and $N_V$ vertical ports, a beamforming weight value for a $([n_h,n_v])^{th}$ beam may be represented as:

$$W_{n_h,n_v} = W_{n_h} \otimes W_{n_v}$$
$$= \left(1 \quad e^{-j2\pi\frac{d}{\lambda}sin\theta_{n_h}} \quad \ldots \quad e^{-j2\pi\frac{d}{\lambda}sin\theta_{n_h}(N_H-1)}\right) \otimes$$
$$\left(1 \quad e^{-j2\pi\frac{d}{\lambda}sin\theta_{n_v}} \quad \ldots \quad e^{-j2\pi\frac{d}{\lambda}sin\theta_{n_v}(N_{l'}-1)}\right)^T,$$

where $\otimes$ represents a Kronecker product of a matrix, $(\cdot)^T$ represents matrix transposition, $\theta_{n_h}=\Delta_H\times(n_h-1)$ and $\theta_{n_v}=\Delta_V\times(n_v-1)$ represent a horizontal angle and a vertical angle of the $([n_h, n_v])^{th}$ beam respectively, and $\Delta_H$ and $\Delta_V$ represent a minimum horizontal angular difference and a minimum vertical angular difference between adjacent beams respectively.

Figure 2:
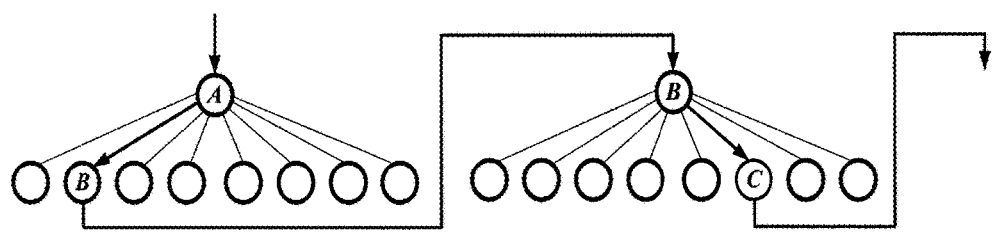
FIG. 2 is a schematic view showing the search of beam groups for reference signals according to the second embodiment of the present disclosure.

With respect to a relationship between the space and the reference signal, as an alternative way, a beam group with a multi-level tree structure may be used so as to improve the spatial resolutions level by level. As shown in FIG. 2, a current-level reference signal beam group with the highest spatial resolution may be designed at first (each element corresponds to a leaf node of the tree structure), and then segmented into several sub-groups. Next, one reference signal beam may be selected for each sub-group as a root (each sub-group and its root nodes form a sub-tree). The root of each sub-tree may serve as a leaf node of a previous-level sub-tree (with a relatively lower spatial resolution). In this way, it is able to form the multi-level tree structure.

It is unnecessary for the UE to acquire the spatial resolution desired to be measured currently, and instead, the UE may merely measure the group of reference signals in accordance with an instruction from the network side device, and transmit the feedback information to the network side device.

Each reference signal in the group of reference signals may correspond to one space in the sector, and the reference signals in different groups may correspond to the spaces of different sizes. For example, a reference signal A corresponds to one of the spaces into which one sector is segmented, and a reference signal B corresponds to one of the sub-spaces into which one space is segmented.

During the implementation, in order to differentiate the feedback information corresponding to different reference signals, an identifier may be assigned to each reference signal. The feedback information is transmitted in unit of groups, so it is merely required to ensure that the reference signals in each sector correspond to different identifiers.

The number of the reference signals and the differentiation modes may be pre-agreed or indicated via signaling.

In one possible embodiment, the reference signal is a CSI-RS.

To be specific, the network side device may transmit a group of CSI-RSs which have been beamformed to the UE. The group of CSI-RSs may be a sub-group broadcast by the network side device. The sub-groups may partially overlap each other, and the beam resolution for different UEs may be different from each other.

The reference signals in the sector correspond to different CSI-RS configurations and/or different CSI-RS ports.

Correspondingly, in the case of transmitting the feedback information to the network side device in accordance with the measurement result, the UE may transmit the identifier of the measured reference signal and the quality information corresponding to the measured reference signal to the network side device.

Here, the quality information may include, but be not limited to, one or both of a Channel Quality Indicator (CQI) and a Transport Block Size (TBS).

During the implementation, the UE may record the identifier of the reference signal with the best channel quality, and in the case of transmitting the feedback information to the network side device, it may mark the identifier corresponding to the reference signal with the best channel quality.

In one possible embodiment, the UE may rank the identifiers of the reference signals and the quality information corresponding to the reference signals in accordance with the channel quality corresponding to the reference signals, and transmit the ranked identifiers and quality information to the network side device.

For example, in the case that, among reference signals A, B and C, the reference signal A has the best signal quality, the reference signal C has the second best signal quality and the reference signal B has the worst signal quality, the reference signals may be ranked as A, C and B, or B, C and A in accordance with the signal quality in the feedback information.

In the case of determining whether or not the beamforming mode for each reference signal is to be adjusted in accordance with the feedback information from the UE, the network side device may determine the quality information corresponding to each reference signal in accordance with the identifier and quality information from the UE, and determine whether or not the beamforming mode for each reference signal is to be adjusted in accordance with the quality information corresponding to each reference signal.

To be specific, the network side device may determine a channel change situation in a time window, or a change situation of the channel quality corresponding to N feedback times, or the channel quality of a plurality of UEs in accordance with the received quality information, and then determine whether or not the beamforming mode for the reference signal is to be further adjusted.

There are various determination modes. For example, the network side device may check whether or not a change amount within a certain time period exceeds a predetermined threshold in accordance with the information reported by the UE. In the case that the change amount exceeds the predetermined threshold, the network side device may determine that the channel is instable and the beamforming mode needs to be adjusted, and otherwise, it may determine that the beamforming mode does not need to be adjusted.

For another example, the network side device may determine a change speed of the channel in accordance with the information reported by the UE. In the case that the change speed of the channel exceeds a predetermined value, the network side device may determine that the channel is instable and the beamforming mode needs to be adjusted, and otherwise, it may determine that the beamforming mode does not need to be adjusted.

In the case that the beamforming mode needs to be adjusted, as an alternative way, the network side device may determine each space in the spaces corresponding to the reference signals with the best quality information, take the reference signals with the best quality information as a group of reference signals, and transmit the group of reference signals which have been beamformed to the UE.

During the implementation, the beamforming mode may be adjusted as follows.

In the case that the $([n_h, n_v])^{th}$ beam needs to be further segmented into 2M and 2N beams, a $([m, n])^{th}$ beam may be represented as:

$$W_{m,n} = W_m \otimes W_n$$
$$= \left(1 \quad e^{-j2\pi \frac{d}{\lambda} \sin\theta_m} \quad \ldots \quad e^{-j2\pi \frac{d}{\lambda} \sin\theta_m (2M-1)}\right) \otimes$$
$$\left(1 \quad e^{-j2\pi \frac{d}{\lambda} \sin\theta_n} \quad \ldots \quad e^{-j2\pi \frac{d}{\lambda} \sin\theta_n (2N-1)}\right)^T,$$

where $\theta_m = (\theta_{n_h} - \Delta_{H1} \times M) + \Delta_{H1} \times (m-1)$ and $\theta_n = (\theta_{n_v} - \Delta_{V1} \times N) + \Delta_{V1} \times (n-1)$ represent a horizontal angle and a vertical angle of the $([m, n])^{th}$ beam respectively, and $\Delta_{H1}$ and $\Delta_{V1}$ represent a minimum horizontal angular difference and a minimum vertical angular difference between adjacent beams respectively.

During the implementation, after determining each space in the spaces corresponding to the reference signals with the best quality information, the network side device may further determine the change speed of the channel in accordance with the information (e.g., whether or not a difference between a maximum value and a minimum value within a certain time period exceeds a predetermined threshold), and then determine whether or not the space needs to be further segmented into sub-spaces. For example, in the case that the change speed of the channel is too large, each space may be segmented into a plurality of sub-spaces. Then, the reference signals corresponding to the sub-spaces may be taken as a group of reference signals, and the group of reference signals which have been beamformed may be transmitted to the UE.

In the case that that a space corresponding to the reference signal with the best quality information has not yet been segmented, the network side device may segment the space into a plurality of sub-spaces, and then determine each sub-space. Through segmenting the spaces corresponding to the reference signals with the best quality information in advance, it is able to directly determine each space in the spaces.

As mentioned above, in the case that the beamforming mode needs to be adjusted, as an alternative way, a reference signal with a higher spatial resolution may be transmitted to the UE, as shown in FIG. 2. The network side device may search the sub-trees in the current reference signal beam groups in accordance with a relatively lower resolution. After a certain sub-tree has been selected (e.g., a node A is determined at first in FIG. 2), a leaf node of this sub-tree may be taken as a group of reference signals for a next iteration. In the case that the reference signal corresponding to a leaf node B in the sub-tree with the current solution has the best channel quality (i.e., the beamforming mode does not need to be adjusted), the UE may select and report the beams in accordance with the group of reference signals corresponding to the leaf node B.

Each sub-group corresponds to one UE and includes several beams. The sub-groups may partially or completely overlap each other. In the case that the sub-groups completely overlap each other, it means that the beam groups desired to be measured by the plurality of UEs are identical.

In the embodiments of the present disclosure, the network side device may be a base station (e.g., a macro base station or a Femtocell), or a Radio Network Controller (RNC), or any other network side devices, or a novel network side device that may be developed in the future.

Figure 3:
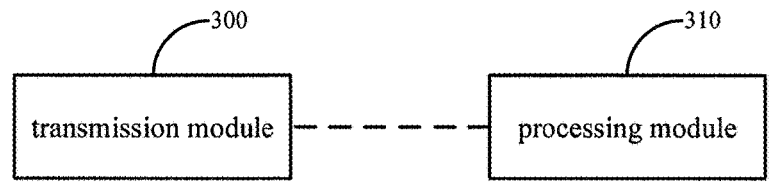
FIG. 3 is a schematic view showing a network side device in the system for measuring CSI according to the third embodiment of the present disclosure.

As shown in FIG. 3, the present disclosure provides in the third embodiment a network side device in the system for measuring CSI, which includes: a transmission module 300 configured to transmit a group of reference signals which have been beamformed to a UE, so as to enable the UE to measure the reference signals, each reference signal in the group of reference signals corresponding to a space in a sector; and a processing module 310 configured to determine whether or not a beamforming mode for each reference signal is to be adjusted in accordance with feedback information from the UE.

In one possible embodiment, the reference signals in the sector correspond to different identifiers.

In one possible embodiment, the processing module is further configured to: determine quality information corresponding to each reference signal in accordance with the identifiers and quality information from the UE; and determine whether or not the beamforming mode for each reference signal is to be adjusted in accordance with the quality information corresponding to each reference signal.

In one possible embodiment, the processing module is further configured to: in the case that the beamforming mode for each reference signal needs to be adjusted, determine each space in the spaces corresponding to the reference signals with the best quality information; and adjust the beamforming mode for the reference signal corresponding to each space, take the reference signals with the best quality information as a group of reference signals, and transmit the group of reference signals which have been beamformed to the UE.

In one possible embodiment, each reference signal is a CSI-RS.

In one possible embodiment, the reference signals in the sector correspond to different CSI-RS configurations and/or different CSI-RS ports.

In one possible embodiment, the group of CSI-RSs includes parts of the CSI-RSs broadcast by the network side device, and the CSI-RSs transmitted to different UEs are partially or completely identical.

In one possible embodiment, the transmission module 300 is further configured to determine different reference signals in accordance with one or more of time domain, frequency domain and code domain.

In one possible embodiment, the different reference signals are orthogonal to each other.

Figure 4:
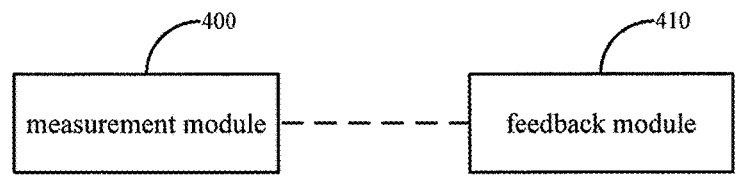
FIG. 4 is a schematic view showing a UE in the system for measuring CSI according to the fourth embodiment of the present disclosure.

As shown in FIG. 4, the present disclosure provides in the fourth embodiment a UE in the system for measuring CSI, which includes: a measurement module 400 configured to measure a group of reference signals which have been beamformed and received from a network side device, each reference signal in the group of reference signals corresponding to a space in a sector; and a feedback module 410 configured to transmit feedback information to the network side device in accordance with a measurement result, so as to enable the network side device to determine whether or not a beamforming mode for each reference signal is to be adjusted in accordance with the feedback information.

In one possible embodiment, the feedback module 410 is further configured to transmit an identifier of the measured reference signal and quality information corresponding to the measured reference signal to the network side device.

In one possible embodiment, the feedback module 410 is further configured to rank the identifiers of the reference signals and the quality information corresponding to the reference signals in accordance with channel quality corresponding to the reference signals, and transmit the ranked identifiers and quality information to the network side device.

Figure 5:
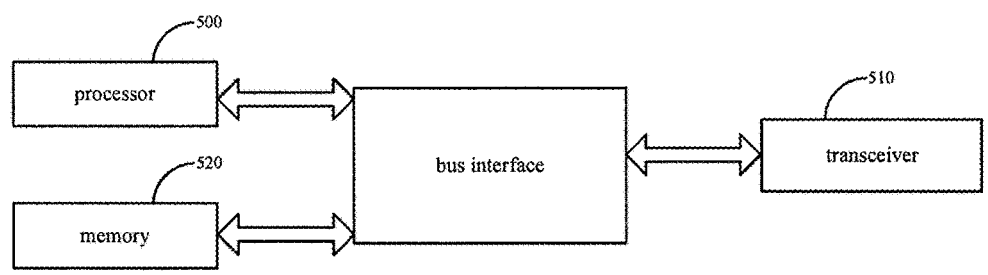
FIG. 5 is another schematic view showing the network side device in the system for measuring CSI according to the fifth embodiment of the present disclosure.

As shown in FIG. 5, the present disclosure provides in the fifth embodiment a network side device in the system for measuring CSI, which includes a processor 500 and a transceiver 510. The processor 500 is configured to: transmit, via the transceiver 510, a group of reference signals which have been beamformed to a UE, so as to enable the UE to measure the reference signals, each reference signal in the group of reference signals corresponding to a space in a sector; and determine whether or not a beamforming mode for each reference signal is to be adjusted in accordance with feedback information from the UE. The transceiver 510 is configured to receive and transmit data under the control of the processor 500.

In one possible embodiment, the reference signals in the sector correspond to different CSI-RS configurations and/or different CSI-RS ports.

In one possible embodiment, the reference signals in the sector correspond to different identifiers.

In one possible embodiment, the processor 500 is further configured to: determine quality information corresponding to each reference signal in accordance with the identifiers and quality information from the UE; and determine whether or not the beamforming mode for each reference signal is to be adjusted in accordance with the quality information corresponding to each reference signal.

In one possible embodiment, the processor 500 is further configured to: in the case that the beamforming mode for the reference signal needs to be adjusted, determine each space in the spaces corresponding to the reference signals with the best quality information; and adjust the beamforming mode for each reference signal corresponding to each space, take the reference signals with the best quality information as a group of reference signals, and transmit the group of reference signals which have been beamformed to the UE.

In one possible embodiment, each reference signal is a CSI-RS.

In one possible embodiment, the reference signals in the sector correspond to different CSI-RS configurations and/or different CSI-RS ports.

In one possible embodiment, the group of CSI-RSs includes parts of the CSI-RSs broadcast by the network side device, and the CSI-RSs transmitted to different UEs are partially or completely identical.

In one possible embodiment, the processor 500 is further configured to determine different reference signals in accordance with one or more of time domain, frequency domain and code domain.

In one possible embodiment, the different reference signals are orthogonal to each other.

In FIG. 5, a bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 510 may consist of one element, or more than one element, e.g., a transmitter and a receiver for communication with any other devices over a transmission medium. The processor 500 takes charge of managing the bus architecture as well general processings, e.g., running a general-purpose operating system. The memory 520 may store data desired for the operation of the processor 500.

Figure 6:
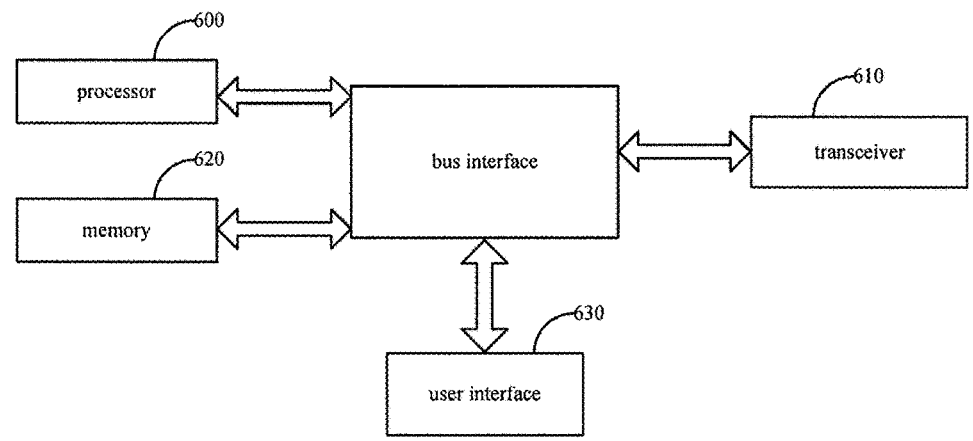
FIG. 6 is another schematic view showing the UE in the system for measuring CSI according to the sixth embodiment of the present disclosure.

As shown in FIG. 6, the present disclosure provides in the sixth embodiment a UE in the system for measuring CSI, which includes a processor 600 and a transceiver 610. The processor 600 is configured to: measure a group of reference signals which have been beamformed and received from a network side device via the transceiver 610, each reference signal in the group of reference signals corresponding to a space in a sector; and transmit feedback information to the network side device via the transceiver 610 in accordance with a measurement result, so as to enable the network side device to determine whether or not a beamforming mode for the reference signals is to be adjusted in accordance with the feedback information. The transceiver 610 is configured to receive and transmit data under the control of the processor 600.

In one possible embodiment, the processor 600 is further configured to transmit an identifier of the measured reference signal and quality information corresponding to the measured reference signal to the network side device.

In one possible embodiment, the processor 600 is further configured to rank the identifiers of the reference signals and the quality information corresponding to the reference signals in accordance with channel quality corresponding to the reference signals, and transmit the ranked identifiers and quality information to the network side device.

In FIG. 6, a bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit, which are not particularly defined herein. Bus interfaces are provided, and the transceiver 610 may consist of one element, or more than one element, e.g., a transmitter and receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick. The processor 600 takes charge of managing the bus architecture as well general processings, e.g., running a general-purpose operating system. The memory 620 may store data desired for the operation of the processor 600.

Based on an identical inventive concept, the present disclosure further provides in some embodiments a method for measuring CSI and a method for CSI feedback. A principle of these methods for solving the problem is similar to that of the above-mentioned system for measuring CSI, so the implementations of these methods may refer to those of the system, which will not be particularly defined herein.

Figure 7:
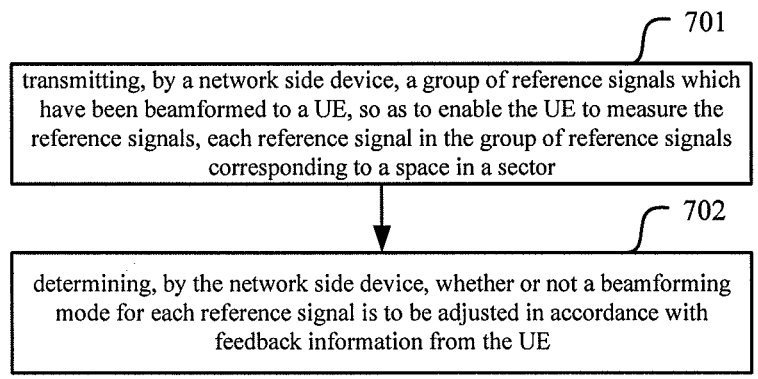
FIG. 7 is a flow chart of a method for measuring CSI according to the seventh embodiment of the present disclosure.

As shown in FIG. 7, the present disclosure provides in the seventh embodiment a method for measuring CSI, including: Step 701 of transmitting, by a network side device, a group of reference signals which have been beamformed to a UE, so as to enable the UE to measure the reference signals, each reference signal in the group of reference signals corresponding to a space in a sector; and Step 702 of determining, by the network side device, whether or not a beamforming mode for each reference signal is to be adjusted in accordance with feedback information from the UE.

In one possible embodiment, the reference signals in the sector correspond to different CSI-RS configurations and/or different CSI-RS ports.

In one possible embodiment, the reference signals in the sector correspond to different identifiers.

In one possible embodiment, the step of determining, by the network side device, whether or not the beamforming mode for each reference signal is to be adjusted in accordance with the feedback information from the UE includes: determining, by the network side device, quality information corresponding to each reference signal in accordance with the identifiers and quality information from the UE; and determining, by the network side device, whether or not the beamforming mode for each reference signal is to be adjusted in accordance with the quality information corresponding to each reference signal.

In one possible embodiment, subsequent to the step of determining, by the network side device, whether or not the beamforming mode for each reference signal is to be adjusted in accordance with the feedback information from the UE, the method further includes: in the case that the beamforming mode for each reference signal needs to be adjusted, determining, by the network side device, each space in the spaces corresponding to the reference signals with the best quality information; and adjusting, by the network side device, the beamforming mode for the reference signal corresponding to each space, taking the reference signals with the best quality information as a group of reference signals, and transmitting the group of reference signals which have been beamformed to the UE.

In one possible embodiment, each reference signal is a CSI-RS.

In one possible embodiment, the reference signals in the sector correspond to different CSI-RS configurations and/or different CSI-RS ports.

In one possible embodiment, the group of CSI-RSs includes parts of the CSI-RSs broadcast by the network side device, and the CSI-RSs transmitted to different UEs are partially or completely identical.

In one possible embodiment, prior to the step of transmitting, by the network side device, the group of reference signals which have been beamformed to the UE, the method further includes determining, by the network side device, different reference signals in accordance with one or more of time domain, frequency domain and code domain.

In one possible embodiment, the different reference signals are orthogonal to each other.

Figure 8:
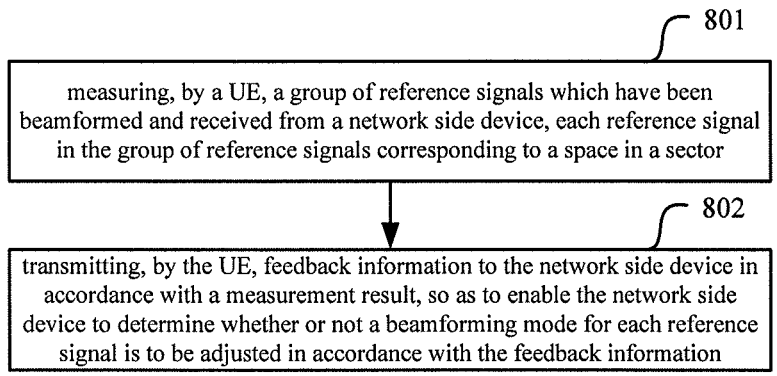
FIG. 8 is another flow chart of the method for measuring CSI according to the eighth embodiment of the present disclosure.

As shown in FIG. 8, the present disclosure further provides in the eighth embodiment a method for measuring CSI, including: Step 801 of measuring, by a UE, a group of reference signals which have been beamformed and received from a network side device, each reference signal in the group of reference signals corresponding to a space in a sector; and Step 802 of transmitting, by the UE, feedback information to the network side device in accordance with a measurement result, so as to enable the network side device to determine whether or not a beamforming mode for each reference signal is to be adjusted in accordance with the feedback information.

In one possible embodiment, the step of transmitting, by the UE, the feedback information to the network side device in accordance with the measurement result includes transmitting, by the UE, an identifier of the measured reference signal and quality information corresponding to the measured reference signal to the network side device.

In one possible embodiment, the step of transmitting, by the UE, the feedback information to the network side device in accordance with the measurement result includes ranking the identifiers of the reference signals and the quality information corresponding to the reference signals in accordance with channel quality corresponding to the reference signals, and transmitting the ranked identifiers and quality information to the network side device.

According to the embodiments of the present disclosure, the network side device transmits a group of reference signals which have been beamformed to the UE, and then determines whether or not the beamforming mode for the reference signal is to be adjusted in accordance with the feedback information from the UE. As a result, it is able to, on the premise that the Massive MIMO technology plays to its strengths, reduce time-frequency resource the overhead caused by the measurement and feedback of downlink reference signals, thereby to improve the resource utilization rate and the system performance.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make further modifications and alterations to these embodiments in accordance with the basic concept of the present disclosure. So, the attached claims are intended to include the preferred embodiments and all of the modifications and alterations that fall within the scope of the present disclosure.

What is claimed is:

1. A method for measuring Channel State Information (CSI), comprising:
    transmitting, by a network side device, a group of reference signals which have been beamformed to a User Equipment (UE), so as to enable the UE to measure the reference signals, each reference signal in the group of reference signals corresponding to a space in a sector, wherein correspondence between the group of reference signals and sector spaces is of a form of a mufti-level tree structure;
    determining, by the network side device, quality information corresponding to each reference signal in accordance with an identifier and quality information from the UE;
    determining, by the network side device, whether or not a beamforming mode for each reference signal is to be adjusted in accordance with the quality information corresponding to each reference signal;
    determining, by the network side device, each space in the spaces corresponding to the reference signals with the best quality information, in the case that the beamforming mode for each reference signal needs to be adjusted; and adjusting, by the network side device, the beamforming mode for the reference signal corresponding to each space, taking the reference signals with the best quality information as a group of reference signals, and transmitting the group of reference signals which have been beamformed to the UE, wherein the network side device determines that a channel for transmitting reference signals to the UE is instable and the beamforming mode needs to be adjusted, in the case that changing speed of the channel exceeds a predetermined value, and otherwise, determines that the beamforming mode does not need to be adjusted.

2. The method according to claim 1, wherein the reference signals in the sector correspond to different identifiers.

3. The method according to claim 1, wherein each reference signal is a Channel State Information-Reference Signal (CSI-RS).

4. The method according to claim 3, wherein the reference signals in the sector correspond to different CSI-RS configurations and/or different CSI-RS ports;
wherein a group of CSI-RSs comprises parts of the CSI-RSs broadcast by the network side device, and the CSI-RSs transmitted to different UEs are partially or completely identical.

5. The method according to claim 1, wherein prior to the step of transmitting, by the network side device, the group of reference signals which have been beamformed to the UE, the method further comprises: determining, by the network side device, different reference signals in accordance with one or more of time domain, frequency domain and code domain, wherein the different reference signals are orthogonal to each other.

6. A network side device for measuring Channel State Information (CSI), comprising a processor and a memory, wherein the memory is configured to store therein programs and data for an operation of the processor, and the processor is configured to read programs stored in the memory, so as to:

transmit a group of reference signals which have been beamformed to a User Equipment (UE), so as to enable the UE to measure the reference signals, each reference signal in the group of reference signals corresponding to a space in a sector, wherein correspondence between the group of reference signals and sector spaces is of a form of a multi-level tree structure;

determine quality information corresponding to each reference signal in accordance with an identifier and quality information from the UE;

determine whether or not a beamforming mode for each reference signal is to be adjusted in accordance with the quality information corresponding to each reference signal;

determine each space in the spaces corresponding to the reference signals with the best quality information, in the case that the beamforming mode for each reference signal needs to be adjusted; and adjust the beamforming mode for the reference signal corresponding to each space, taking the reference signals with the best quality information as a group of reference signals, and transmitting the group of reference signals which have been beamformed to the UE, wherein the network side device determines that a channel for transmitting reference signals to the UE is instable and the beamforming mode needs to be adjusted, in the case that changing speed of the channel exceeds a predetermined value, and otherwise, determines that the beamforming mode does not need to be adjusted.

7. The network side device according to claim 6, wherein the reference signals in the sector correspond to different identifiers.

8. The network side device according to claim 6, wherein each reference signal is a Channel State Information-Reference Signal (CSI-RS).

9. The network side device according to claim 8, wherein the reference signals in the sector correspond to different CSI-RS configurations and/or different CSI-RS ports, wherein a group of CSI-RSs comprises parts of the CSI-RSs broadcast by the network side device, and the CSI-RSs transmitted to different UEs are partially or completely identical.

10. The network side device according to claim 6, wherein the network side device is further configured to determine different reference signals in accordance with one or more of time domain, frequency domain and code domain, wherein the different reference signals are orthogonal to each other.

* * * * *